(12) United States Patent
Huber

(10) Patent No.: US 8,465,805 B2
(45) Date of Patent: Jun. 18, 2013

(54) GLASS VENEER ON CERAMICS

(76) Inventor: Walter Henry Huber, St. Ives (AU)

( * ) Notice: Subject to any disclaimer, the term of this patent is extended or adjusted under 35 U.S.C. 154(b) by 262 days.

(21) Appl. No.: 12/739,219

(22) PCT Filed: Oct. 24, 2008

(86) PCT No.: PCT/AU2008/001584
§ 371 (c)(1),
(2), (4) Date: Jul. 7, 2010

(87) PCT Pub. No.: WO2009/052585
PCT Pub. Date: Apr. 30, 2009

(65) Prior Publication Data
US 2010/0304029 A1    Dec. 2, 2010

(30) Foreign Application Priority Data

Oct. 25, 2007  (AU) ............................... 2007905829

(51) Int. Cl.
*B05D 3/12* (2006.01)
(52) U.S. Cl.
USPC ........................................ 427/289
(58) Field of Classification Search
USPC .......................................... 427/289; 264/133
See application file for complete search history.

(56) References Cited

U.S. PATENT DOCUMENTS

| 4,017,662 | A | | 4/1977 | Gehman et al. |
| 4,295,243 | A | | 10/1981 | King |
| 5,605,493 | A | * | 2/1997 | Donatelli et al. ............... 451/41 |
| 6,454,632 | B1 | * | 9/2002 | Jones et al. ..................... 451/28 |
| 2002/0037370 | A1 | * | 3/2002 | Bartkowiak et al. ........ 427/407.1 |
| 2002/0147258 | A1 | * | 10/2002 | Yarmey et al. ................ 524/262 |
| 2006/0246724 | A1 | | 11/2006 | Takamatsu |

FOREIGN PATENT DOCUMENTS

| GB | 563548 | 8/1944 |
| JP | 63099268 | 4/1988 |

OTHER PUBLICATIONS

International Search Report for PCT/AU2008/001584, dated Dec. 11, 2008.

* cited by examiner

*Primary Examiner* — Kelly M Gambetta
(74) *Attorney, Agent, or Firm* — Roylance, Abrams, Berdo & Goodman, L.L.P.

(57) ABSTRACT

A method of polishing a fired ceramic article such as brick, tile etc article comprising applying to a surface of fired ceramic article a hardening/densifying compound comprising a member selected from the group consisting of hydroxides, silicates, siliconates, fluorosilicates, siloxanes, silazanes, silanes, silicon esters, and combinations thereof and allowing the hardening/densifying compound to contact with the surface for a period of time sufficient to allow the compound to harden surface, which can then be ground, polished etc to a high gloss.

48 Claims, No Drawings

GLASS VENEER ON CERAMICS

TECHNICAL FIELD

The present invention relates to a method for imparting a polished hardened/densified surface to a solid kiln fired ceramic article such as a brick, tile, panel and three dimensional solid. The invention also relates to a ceramic article obtained by the method.

BACKGROUND ART

Any discussion of the prior art throughout the specification should in no way be considered as an admission that such prior art is widely known or forms part of common general knowledge in the field.

It is well known that the polishing of natural stone enhances the aesthetic appeal and value of the stone. Polished marble, granite, terrazzo, etc are expensive building materials but provide a striking and enduring appearance. The polishing of concrete is also known to enhance its value. Specialized machines and equipment have been in production for the polishing of stone and stone floors for over 100 years. Today advanced automated equipment with low cost, advanced and durable diamond tooling make the polishing of stone fast and affordable.

Ceramics for thousands of years have been widely used as decorative, ornamental and construction materials. Because of their strength, durability, ease of manufacture, ease of installation, and relatively low cost, ceramics are frequently the material of choice for floors, walls, panels and pottery. However, there are many instances where it is desirable to have a wall or a surface with a pleasing high gloss finish or shine. It is known in the art that the polishing of fired ceramics has not been possible due to their physical properties.

Typically, to date the only method known to impart a gloss surface onto a ceramic has been through glazing. The method of glazing of ceramic surfaces has been well known for centuries and involves painting a heat activatable glaze onto the article which is subsequently fired to provide a gloss surface.

Although the constituents of kiln fired ceramic are similar to those found in concrete for example, they are present in substantially different proportions. For instance, the main constituent of cement is calcium oxide, typically present in an amount of 61-67% as compared to a typical fired ceramic article like a brick, which contains around 2.8% calcium oxide. Conversely, a brick contains around 66% silicon dioxide which is present in amounts around 23% in cement.

A fired ceramic and concrete also differ in appearance. A ceramic is fired as opposed to concrete which is poured. This imparts a different appearance, however, the major difference lies in the chemistry, since a ceramic becomes an entirely different substance upon firing. During firing, the physical and chemical composition of the constituents of the ceramic are permanently and irreversibly changed. The ceramic constituents undergo a chemical reaction due to the activation and mobility of particles created by the firing process. The chemical reaction created by intense heat of over 1000 degree centigrade enables the formation of a ceramic in contrast to that of concrete which would be totally destroyed by such temperatures. Ceramics are considerably softer and more friable than cement or most other stones and hence the inability to polish them. Ceramics differ intensely from each other largely due to the availability of many different clays mined around the world such as kaolin, fire clay, ball clay, earthen ware and stone ware and the mixture of those clays to form a specific ceramic suitable to manufacture a specific product.

Apart from the variations of clays there are many combinations of those clay mixes. The variations are extensive with a large number of fillers added to create a ceramic of a certain colour, density, moisture content, particle size and durability. The vast product range manufactured from kiln fired ceramics includes multitudes of shapes, uses and sizes with seemingly infinite range of designs. All these factors make polishing fired ceramics a much more different proposition than polishing cement or other stones.

Porcelains are a specific and separate form of a fired ceramic with distinct physical properties. The formulation of kaolin, ball clay, ground feldspar, flint and other additives are designed to produce a ceramic with different and specific properties such as hardness, translucency, density and it is a ceramic that absorbs the least amount of water. These are known but their chemistry is different yet again from fired ceramics such as bricks and tiles, and they are also fired at significantly higher temperatures.

It is an object of the present invention to overcome or ameliorate at least one of the disadvantages of the prior art, or to provide a useful alternative.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

SUMMARY

According to a first aspect the invention provides a method of polishing a surface of a fired ceramic article or surface comprising the steps of:

a) applying to a surface of a fired ceramic article a hardening/densifying compound comprising a member selected from the group consisting of hydroxides, silicates, siliconates, fluorosilicates, siloxanes, silazanes, silanes, silicon esters and combinations thereof;

b) allowing the hardening/densifying compound to contact the surface for a period of time sufficient to allow the compound to soak in and chemically react thereby hardening/densifying the surface; and c) polishing the surface.

Preferably polishing the surface further comprises applying to the ceramic surface a polishing compound; and polishing the ceramic surface.

More preferably in the method the period of time is sufficient to allow the compound to penetrate and harden the surface and it further comprises the steps of d) neutralizing the surface;

e) optionally sintering the surface; and f) steam cleaning the surface

The hardening/densifying solution may be applied by painting, dipping, spraying or the like, or it may be applied under vacuum or at pressure to increase penetration into the surface of the ceramic article.

Preferably, the method further comprises the steps of:

d) applying to the ceramic surface a polishing compound during polishing or;

e) polishing the ceramic surface without the polishing compound using polishing pads, discs, drums or belts lubricated by water or dry.

Preferably the fired ceramic article is a brick, tile, panel, wall or a three dimensional solid. Most preferably it is a brick. Preferably in another embodiment the surface is an in-situ wall.

Preferably the hardening/densifying compound is applied in a solvent selected from the group consisting of water, alcohol and organic solvents. Preferably the hardening/densifying compound is applied at a rate sufficient to penetrate the surface from 0.01 mm.-10 mm. It is preferred if the hardening/densifying compound in contact with the ceramic surface is allowed to dry and cure before grinding.

Preferably the hardening/densifying compound comprises water and a compound selected from the group consisting of hydroxides, silicates, siliconates, fluoro silicates, siloxanes, silazanes, silanes, silicon esters, and combinations thereof at a ratio from about 8:1 to 1:1 by volume.

In one embodiment, the hardening/densifying compound comprises sodium hydroxide, potassium hydroxide, caesium hydroxide or mixtures thereof in water. Most preferably a solution of NAOH and KOH is used.

In another embodiment, the hardening/densifying compound is comprised of a silicate or mixture of silicates, preferably sodium silicate. Silicates are advantageously added in those cases where the silicon in the ceramic article is present at low concentrations and/or is in a non-reactive form.

In one particularly preferred embodiment, the hardening/densifying compound comprises of sodium hydroxide, potassium hydroxide, caesium hydroxide and fumed silica.

In another embodiment, the hardening/densifying compound is comprised of a fluorosilicate or mixture of fluorosilicates. Preferably the fluorosilicate is selected from the group consisting of zinc fluorosilicate, magnesium fluorosilicate and mixtures thereof.

In another embodiment, the hardening/densifying compound is comprised of a siliconate or mixture of siliconates. Preferably the siliconate is sodium methyl siliconate.

The polishing compound maybe the same or different from the hardening/densifying compound, however the polishing compound is preferably the same as the hardening/densifying compound. Typically, the compound will be applied as a solution. The polishing compound may for preference be applied at a rate more dilute than the hardening/densifying compound.

Preferably the polishing compound comprises hydroxides, silicates, siliconates, fluorosilicates, siloxanes, silazanes, silanes, silicon esters, and combinations thereof, in a solvent comprising a member selected from the group consisting of water and alcohol.

Preferably the polishing compound comprises water and a compound selected from the group consisting of hydroxide, silicates, siliconates, fluorosilicates, siloxanes, silazanes, silanes, silicon esters, and combinations thereof at a ratio from about 30:1 to 1:1 by volume, more preferably about 10:1 by volume.

Preferably the surface is polished mechanically by a polishing disc, drum or pad having a grit coarseness range from about 20 to 10,000. The surface may be additionally be ground before treatment, eg to flatten or smooth the surface.

According to a second aspect the invention provides a method of polishing a kiln fired ceramic surface, comprising the steps of (a) applying to the ceramic surface a diluted polishing compound at a rate sufficient to adequately penetrate the surface selected from the group consisting of hydroxides, silicates, siliconates, fluorosilicates, siloxanes, silazanes, silanes, Silicon esters, and combinations thereof in water or alcohol; and (b) polishing the ceramic surface to which the compound has been applied.

Preferably the diluted polishing compound is comprised of water and a compound selected from the group consisting of hydroxides, silicates, siliconates, fluorosilicates, siloxanes, silanes, silicon esters, and combinations thereof.

The method of the second aspect may preferably further comprise the steps of: (c) cleaning the ceramic surface; (d) applying to the ceramic surface more of the diluted polishing compound; and (e) polishing the ceramic surface with a polishing pad, disc, or drum having a finer grit than was used in previous polishing step.

Steps (c) through (e) may be repeated until the surface has a desired level of shine.

According to a third aspect the invention provides a method of honing and polishing a rough, irregular, ceramic surface, comprising the steps of:

(a) honing the surface with a rough grit honing pad, disc or drum with or without a lubricant to produce a substantially smooth, even surface;

(b) applying to the ceramic surface a hardening/densifying compound selected from the group consisting of hydroxides, silicates, siliconates, fluoro silicates, siloxanes, silazanes, silanes, silicon esters, and combinations and solutions thereof in solvents comprising a member selected from the group consisting of water and alcohol;

(c) allowing the hardening/densifying compound to remain in contact with the surface for a period of time sufficient to penetrate, harden and cure the surface of the ceramic; and (d) polishing the ceramic surface.

Preferably the lubricant is water.

Preferably the method of the third aspect further comprises the steps of (e) cleaning the ceramic surface;

(f) applying to the ceramic surface a polishing compound;

(g) polishing the ceramic surface with a polishing pad, disc or drum having a finer grit than was used in previous polishing step; and repeating steps (e) through (g) until, upon cleaning, the surface has a desired level of shine.

Preferably the polishing compound is a diluted polishing compound.

The method of the third aspect may further comprise a preliminary step of cleaning the ceramic and allowing the ceramic surface to dry prior to the step of applying the hardening/densifying compound to the ceramic surface, or alternatively it may further comprise removing an existing coating before honing and polishing the surface, the method comprising the preliminary steps of:

(i) abrading the surface with a coarse rotating grinding disc and or sandblasting;

(ii) applying a chemical stripper to remove any remaining part of the coating; and (iii) cleaning the ceramic surface.

According to a fourth aspect the invention provides method of removing and levelling soft, porous ceramic from a cured ceramic surface and polishing the surface, the method comprising the steps of (a) abrading and removing the soft surface with a coarse rotating grinder;

(b) cleaning the surface and allowing it to dry;

(c) applying to the ceramic surface a hardening/densifying compound selected from the group consisting of hydroxides, silicates, siliconates, fluorosilicates, siloxanes, silazanes, silanes, silicon esters, and combinations and solutions thereof in solvents comprising a member selected from the group consisting of water and alcohol;

(d) allowing the hardening/densifying compound to remain in contact with the surface for a period of time sufficient to harden and/or densify the surface of the ceramic;

(e) polishing the ceramic surface with a polishing pad, disc or drum having a grit coarseness from about 20 to 10,000;

(f) cleaning the ceramic surface;

(g) applying to the ceramic surface a diluted polishing compound selected from the group consisting of water and hydroxides, silicates, siliconates, fluorosilicates, siloxanes, silazanes, silanes, silicon esters, and combinations and solutions thereof in solvents comprising a member selected from the group consisting of water and alcohol;

(h) polishing the ceramic surface with a polishing pad, disc or drum having a less rough grit than was used in previous polishing step; and (i) repeating steps (f) through (h) until, upon cleaning, the surface has a desired level of shine.

The methods of the present invention further comprise treating the polished solid kiln fired ceramic with a diluted acidic solution. It is applied and allowed to remain in contact with the surface for a period of time with the surface and the surface of the solid clay kiln fired ceramic is then rinsed with water or a steam cleaner.

Preferably the hardening/densifying solution is applied to the solid clay kiln fired ceramic to form an alumino silicate glass, calcium silicate glass or multi component silicate glass.

According to a fifth aspect the present invention provides a fired ceramic prepared by the method of any one of the preceding aspects of the invention having a surface of altered appearance.

According to a sixth aspect the invention provides fired ceramic having a polished surface of alumino silicate glass, calcium silicate glass or multi component silicate glass. Preferably the fired ceramic has a non-stick surface. Preferably the fired ceramic has a surface resistant to mineral leaching. Preferably the fired ceramic has a surface resistant to penetration of oil, paint, solvents, and other chemicals. Preferably the fired ceramic has a surface which reflects light. Preferably the fired ceramic has a surface resistant to abrasion and weathering.

Preferably the fired ceramic is in the form of a brick or tile or wall.

DESCRIPTION

The invention will be described with reference to bricks, although it will be appreciated that the invention can be used with any suitable ceramic article or structure.

The physical grinding and polishing of solid clay kiln fired ceramics, such as bricks, varies from the grinding and polishing of other materials because the ceramic, although fired at high temperatures, is relatively loose in its structure. The bonds within the ceramic between different components are such that under coarse grinding the components fall out and the surface is deteriorated leaving pits which are deeper than the particle sizes (and resultant marks) of the grinding wheel. As such, continued polishing does not improve surface quality.

The present inventor has found that after performing a chemical reaction on the surface of the ceramic with hydroxide or a hydroxide mix, either with or without dissolved silica, or by reacting various silicon compounds (such as silicates, siliconates, fluorosilicates, siloxanes, silazanes, silanes, silicon esters), it is possible to ultimately polish a fired ceramic article such as a brick to a high gloss because of the creation of a hard consolidated ceramic surface. Compounds such as silicates, siliconates, fluorosilicates, siloxanes, silazanes, silanes, silicon esters have been used to harden/densify concrete before polishing, as disclosed in U.S. Pat. No. 6,454,632 to Jones et al. Without wishing to be bound by theory, it is believed that hydroxide or a hydroxide mix (either with or without dissolved silica) or the other silicon compounds acts to stabilize/densify/harden the surface of the ceramic article. This surface can initially be ground flat to create a smooth, regular surface ready for chemical application. On further grinding and polishing, it may be worked upon with finer polishing grits in the usual way—the surface being successively re-ground with finer grits to remove the pit marks left by the earlier grinding processes.

Typically, a first grinding takes place before any chemical treatment is carried out. This may be done wet or dry using a grit size of between 20-120. If the process of grinding is carried out wet the ceramic has to be subsequently dried before application of the hardening/densifying compound. If dry grinding is employed, the dust should be captured by an approved dust extraction system so as not to create a health hazard for the operator.

The grinding of an unmodified ceramic using a coarse grinding wheel has limitations due to the specific nature of solid clay/lime kiln fired ceramics. The overwhelming problem is the deterioration of the surface in which small to microscopic particles are removed out of the structure because the ceramic structure is friable and unable to withstand the pressures of grinding. Chipping of the edges of the ceramic occurs as a standard coarse grinding wheel grinds the ceramic surface. Normal grinding wheels are made of segmented diamonds attached to a rotating wheel, disc or drum which chip the edges of the ceramic as the segments of the diamond "hit" the edges or tear out loose unconsolidated particles from the surface. This force is significant, and provides a shock to the ceramic surface every time a diamond segment hits it. The ceramic is unable to withstand the intermediate pressure exerted by the diamond tool as it passes over the ceramic surface during the grinding process.

One way to eliminate these fluctuations in pressure and impact caused by the diamond segments is to use a resin to "fill in" the space between the diamond segments, so as to create a greater uniformity in pressure. Another way to overcome the impact of the diamond segments is to have a continuous diamond surface.

In the initial grinding process the undulated or irregular surfaces are ground generally flat before the polishing process can begin. Once the surface is chemically modified, successively finer grits of grit sizes of 200-10000 are used to achieve an increasingly smooth surface. This usage of finer grits achieves an ever increased lustre using either dry or lubricated abrasives.

The present inventor has discovered that it is possible to polish a ceramic when the surface of the ceramic is changed structurally and chemically into a totally new substance with different properties. The application of a hardening/densifying agent, which is concentrated sodium hydroxide, potassium hydroxide and/or cesium hydroxide used separately or mixed together with silica or silicates, siliconates, fluorosilicates, siloxanes, silazanes, silanes, silicon esters make the surface harder and/or denser and capable of being polished to a high gloss. Without wishing to be bound by theory, the action of the aqueous hydroxides dissolves species such as Si, Al, Mg, Ca and others in the heat activated clay. The mobility of the chemical species then enables a variety of complex chemical interactions. The condensation of the chemical species into a stable inorganic polymer network changes the ceramic surface into an array of glasses.

In addition to the hydroxide/fumed silica mixtures the addition of extra Al, Mg, Ca and other suitable cations to the solution makes it possible to tailor the reaction to achieve distinct desirable properties in the ceramic surface e.g. hardness and hence scratch resistance. Due to the transformation of the ceramic into a type of glass, the properties of the ceramic are enhanced allowing different uses of the ceramic. The increased hardness makes the surface more resistant to weathering, reflecting light and hence heat saving on energy in hot climates. The ceramic/glass surface is also better able to withstand heat without deterioration. The process also inhibits mould, mildew and other forms of microbial growth due to the alkaline nature of the process.

Alternatively, the ceramic can be treated with a reactive silicon compound, such as silicates, siliconates, fluorosilicates, siloxanes, silazanes, silanes, silicon esters bricks. These have been used previously in treating concrete but surprisingly are also useful in the treatment of ceramics as agents for hardening/densifying the surface prior to polishing.

The present invention is described with reference to bricks, although it will be appreciated that it is not limited to bricks but covers all solid clay/lime kiln fired ceramic articles.

The chemical composition and structure of various clay and/or lime based kiln fired ceramics varies, but generally consists of clay and/or lime, and a filler of some kind such as sand and water. Chemically, they are composed largely of quartz, illite and kaolinite with some feldspar and carbonate (Buchwald, Kaps & Hohmann, 2003). Actual percentages vary, depending on the minerals added to give the desired colour or other properties such as hardness, but general analysis shows the following chemical composition (Kaps & Buchwald, 2002):

|  | LiO | $SiO_2$ | $Al_2O_3$ | $Fe_2O_3$ | CaO | MgO | $TiO_2$ | $K_2O$ | $Na_2O$ |
|---|---|---|---|---|---|---|---|---|---|
| Brick Powder | 0.9% | 66.7% | 15.8% | 5.3% | 2.8% | 3.8% | 0.53% | 3.7% | 0.79% |

The components mixed with water are then mixed and formed into blocks, tiles, sheets and three dimensional products before being fired at required temperatures to form solid clay kiln fired ceramics.

The component clay in clay/lime based kiln fired ceramics is thermally activated into a reactive substance (activated clay e.g. metakaolin) by the process of dehydroxylation (Buchwald, Kaps & Hohmann, 2003; Kaps & Buchwald, 2002). The activated clay then undergoes a process of disintegration of its solid network by an alkali hydroxide solution (e.g. KOH, NaOH, CsOH) which produces reactable silicate, carbonate and aluminate monomers in solution. Condensation of the silicate, carbonate and aluminate monomers then occurs during a setting period to create as stable inorganic polymer network (Kaps & Buchwald, 2002). In effect, it is a type of multicomponent/aluminosilicate glass (Mele, Biesemans & Wu, 1996).

The method of honing and polishing a rough, irregular, ceramic surface, comprises the following steps: (a) honing the surface with a rough grit honing pad, disc or drum with a grit of 20-150 with or without a lubricant to produce a substantially smooth, even surface; (b) applying to the ceramic surface a hardening/densifying compound selected from the group consisting of hydroxides, silicates, siliconates, fluorosilicates, siloxanes, silazanes, silanes, silicon esters, and combinations of above solutions in solvents comprising a member selected from the group consisting of water and or alcohol; (c) allowing the hardening/densifying compound to remain in contact with the surface for a period of time sufficient to harden and/or densify the surface of the ceramic; (d) grinding the surface with a grit of 80-150; (e) using disks, pads, drums with increasingly fine grits from 200-10000 in sanding and polishing process of to achieve a desired polish; (f) after the hardening/densifying compound has reacted with the ceramic and the final polishing has been done a number of steps can be carried out to prevent the migration of the non reacted compound out of the ceramic. This non reacted access of the hardening/densifying compound is very undesirable due to, as in the using of strong hydroxide mixes a corrosive film forms on the surface of the ceramic. This film reduces the lustre of the polish and is possibly dangerous if touched by an unprotected skin/eye. It is therefore important to neutralize the polished ceramic, although in time the reaction of carbon dioxide and water vapour in the air forming a diluted carbonic acid would neutralize the ceramic. It is advisable to neutralize the ceramic through the application of a diluted acid such as a hydrochloric acid. Although the curing process does not need heat and is based on principally time (approximately 28 days to fully cure) it is advisable to accelerate the curing by application of heat to the surface of the ceramic. The intensity and temperature is altered to suit the nature of the ceramic. This furthermore inhibits the migration of the non reacted access compound. The newly formed glass/ceramic surface can also be hardened by a heat sintering process done after the application of the hardening/densifying compound. The final step of washing the ceramic by water rinsing and or steam cleaning the surface removes the remaining surface residue left.

In addition to hydroxides, there are several classes of silicon containing compounds that can be used to improve the characteristics of ceramic surfaces.

The most useful of these are silicates, siliconates, and fluoro silicates, with silicates being most preferred. However, siloxane, silazane, and silane compounds are also useful. In fact any silicon compound which will react with open bonding sites on a ceramic surface may be used in accordance with the principles of the present invention. Compounds such as siloxanes and silazanes give reactions similar to the silicates with the elimination of alkoxide or amide groups. The following discussion will consider the relevant aspects of each of the above specifically mentioned compounds.

1. Soluble Inorganic Silicates:

These materials react with existing silicate materials in the ceramic surface to improve the strength, surface hardness, and hydrophobic characteristics to the ceramic surface. A general chemical formula for soluble inorganic silicates is:

$$M_xSi_yO_z$$

where M is an alkali metal such as lithium, sodium, potassium, rubidium, or caesium, or mixtures thereof; x is an integer, such as 1, 2, 4, 6, 8, 10, etc.; y is an integer such as 1, 2, 5, 11, 14, etc.; and z is an integer such as 1, 3, 6, 10, 12, 15, 20, etc. It will be apparent to one skilled in the art that x, y, and z are numbers which reflect the valency of the elements in the chemical species. Specific examples of soluble inorganic silicates which are suitable for use in accordance with the present invention include: $Na_4Si_{17}O_{16}$, $K_4Si_{15}O_{12}$, $Na_4SiO_4$, $KHSi_2O_5$, $Na_6Si_2O_7$, and $K_2Si_2O_5$.

These silicates may be used as pure compounds, but more typically, are dissolved in solvents such as water or alcohol, and are applied as mixtures of the solvent, and one or more of the above species in solution. Surfactants may also be added as needed, along with other components such as catalysts, colourings, pigments, or dyes if desired. This is also true of the other chemical species discussed below. For reasons of cost and practicality, they are preferably used in a solution, mixture, or mixture of solutions containing the described species or species type, and other species and mixture components.

2. Siliconates:

Siliconates also interact with existing silicate materials in the ceramic surface to improve the strength, surface hardness, and hydrophobic characteristics of the surface as with the soluble inorganic silicates discusses above. Siliconates are silicates with an organic group added. A representative formula is:

$$(RSiO_x)_y M_z$$

where R is an organic group, typically a small alkyl group comprising 1 to 10 carbon atoms, branched or unbranched, or an aryl group comprising a ring of 6 carbon atoms, such as methyl ($CH_3$), ethyl ($C_2H_5$), decyl ($C_{10}$, $H_{21}$), or phenyl ($C_6H_5$); x is a small integer, normally 1 or 3; y is a small integer, normally from 1 to 10, though it could be larger; z is an integer, normally from 1 to 4; and M is an alkali metal, such as those mentioned above. Alternatively, M may also include other species, such as magnesium, zinc, or tin. Specific examples of siliconates which are suitable for use in accordance with the present invention include: $CH_3SiO_3K_3$, $C_4H_9SiO_3Na_3$, dimer ($CH_3SiO_2$) $ONa_4$ (a polymer form), and polymer $CH_3SiO_2Na$ (extended polymeric form).

3. Fluorosilicates:

Like silicates and siliconates, fluorosilicates also interact with silicate materials in the ceramic surface to improve Si—O bonding, and improve the strength, surface hardness, and hydrophobic characteristics of the ceramic, as discussed above. A general formula for fluorosilicates is:

$$M_x(SiF_y)_z$$

where M is an alkali metal such as lithium, sodium, potassium, rubidium, or caesium, or an alkaline earth metal, such as magnesium, or another metal such as manganese, zinc, or tin; x is an integer such as 1 or 2; y is an integer such as 6; and z is a small integer such as 1 or 2. Specific examples of fluorosilicates which are suitable for use in accordance with the present invention include: $Na_2SiF_6$, $MgSiF_6$, $ZnSiF_6$, and $Sn(SiF_6)_2$.

4. Silicon Esters:

Silicon esters are silicon compounds with carboxylic acids bonded to the silicon atom. Silicon esters are relatively insoluble in water, but can be used as dispersions in water for treatment of ceramic in accordance with the principles of the present invention. A general formula for a silicon ester is:

$$R_xSi(CO_2R')_y$$

where R is an organic group, typically a small alkyl group comprising 1 to 10 carbon atoms, branched or unbranched, or an aryl group comprising a ring of 6 carbon atoms, such as $CH_3$ (methyl), $C_4H_9$ (butyl), or $C_8H_{17}$ (octyl); and x and y are small integers selected such that x+y=4. R' is another organic group which could be the same as R, or it could be a different organic group, frequently having 8 to 10 carbon atoms. Examples of silicon esters which may be used in accordance with the present invention include $CH_3Si(COO—CH_3)_3$ (methyltriacetoxysilane) and $(C_4H_9)_2Si(COO—CH_3)_2$ (dibutyldiacetoxysilane).

5. Siloxanes

Siloxanes are silicon alkoxides (though they are sometimes mistakenly referred to as silicon esters), are relatively insoluble in water, and hydrolyse to $SiO_2$ and/or other products quite easily. However, siloxanes can be used as dispersions in water for treatment of ceramics in accordance with the principles of the present invention. Two general formulas for siloxanes which may be used in accordance with the present invention are:

$$RSi(OR')_3 \text{ or } Si(OR')_4$$

where R is an organic group, typically a small alkyl group comprising 1 to 10 carbon atoms, branched or unbranched, or an aryl group comprising a ring of 6 carbon atoms, such as $CH_3$, $C_6H_5$, or $C_8H_{17}$; and R' is a second organic group which like R is a small alkyl group or aryl group, and could be the same as or different than R, such as $C_2H_5$, or $(CH_3)_2CH$. Alternatively, the R group could comprise a functional group such as amine, alcohol, mercaptan, etc. One example would be $H_2N—CH_2CH_2—Si(OCH_3)_3$. Polymers of these compounds may also be used as the hardening/densifying agent. Catalysts such as metal-organic compounds of zirconium (Zr), cerium (Ce), niobium (Nb), and titanium (Ti), such as $Ti(OR')_4$ may also be added to the hardening/densifying compound to improve the reactions with ceramic.

It is believed that siloxanes do not have as much effect on hardening/densifying the ceramic surface as some of the other species mentioned above, such as silicates and siliconates. However, these substances still help impart hydrophobic properties to the surface, and may thus be used in accordance with the principles of the present invention.

6. Silazanes:

Silazanes are compounds with silicon bonded to basic nitrogen. Like the siloxanes, silazanes are also relatively insoluble in water, and if used are preferably used as dispersions in water. A general formula would be:

$$R_xSi(NR'_y)_z$$

where R is an organic group, typically a small alkyl group comprising 1 to 10 carbon atoms, branched or unbranched, or an aryl group comprising a ring of 6 carbon atoms; R' is a second organic group which, like R, is a small alkyl group or aryl group, and could be the same as or different than R; x is an integer such as 1, 2, 3, etc.; y is an integer such as 1, 2, etc.; and z is an integer chosen such that x+z=4. Dimers, trimers, and polymers of these silazanes may also be used. A specific example of a silazane useful in accordance with the principles of the present invention is $[(CH_3)_2Si]_2(NCH_3)$.

Like the siloxanes, it is believed that silazanes do not have as much effect on hardening/densifying the ceramic surface as silicates, siliconates, and fluorosilicates. However, these substances still help impart hydrophobic properties to the surface, and may thus be used in accordance with the principles of the present invention.

7. Halosilanes:

Halosilanes comprise silanes bonded to a halogen. A general formula for a halosilane suitable for use according to the present invention would be:

$$R_xSiX_y$$

where R is an organic group, typically a small alkyl group comprising 1 to 10 carbon atoms, branched or unbranched, or an aryl group comprising a ring of 6 carbon atoms; X is a halogen, such as chlorine, bromine, iodine, etc.; and x and y are small integers, such as 1, 2, 3, etc., selected such that x+y=4.

Halosilanes react effectively with Si and O species in the presence of bases such as amines, sodas, etc., and thus help improve the properties of the ceramic. One skilled in the art will also recognize that when mixed, solutions of halosilanes quickly form siloxanes through reaction with the components of the solution, as discussed in the examples below. Operative examples of halosilanes which are useful in accordance with the principles of the present invention are $(C_6H_5)_2SiCl_2$, and $(C_8H_{17})SiBr_3$. Reactive organic groups may also be used with silanes to improve their reaction with the ceramic. As used herein, the terms silane and halosilane are both used to refer to halosilanes.

Like the siloxanes and silazanes, it is believed that the halosilanes do not have as much effect on hardening and densifying the ceramic surface as silicates, siliconates, and fluorosilicates. However, these substances still help impart hydrophobic properties to the surface, and may thus be used in accordance with the principles of the present invention. It should also be recognized that some types of halosilanes form acidic species which can damage a ceramic, and must be accounted for, such as by the addition of acid neutralizing compounds. For example, butyltrichlorosilane tends to form acidic chlorides which can cause pitting in the ceramic surface. However, the addition of a suitable amount of triethylamine is effective to reduce the acidity of the hardening/densifying compound.

The general process of polishing/hardening a ceramic surface in accordance with the principles of the present invention involves first applying to the ceramic a hydroxide, silicate, siliconate, fluorosilicate, siloxane, silazane, silane, and/or silicon ester based hardening/densifying compound. This compound, in solution, is applied to the ceramic surface at a suitable rate to substantially wet the surface, and is allowed to remain in contact with the surface for a period of time sufficient to allow the compound to fully soak into the surface of the ceramic so that the ceramic may be hardened/densified. A polishing compound may be then applied to the surface to form a polishing slurry as the surface is buffed or polished using for example, a rotary polishing machine. The polishing compound may comprise water alone, or it may comprise a diluted version of a hardening/densifying compound, that is, a solution of hydroxide, silicate, siliconate, fluorosilicate, siloxane, silazane, silicon ester, and/or silane compounds. The diluted polishing compound may be applied prior to polishing, or contemporaneously with the polishing step.

In the hardening/densifying compound, the water or alcohol to hydroxide, silicate, siliconate, fluorosilicate, siloxane, silazane, silicon ester, and/or silane should be a ratio of from about 20:1 to 1:1 by volume. However, a preferred ratio is about 3:1 or 5:1. In the diluted polishing compound, where water alone is not used, the water or alcohol to hydroxide, silicate, siliconate, fluorosilicate, siloxane, silazane, silicon ester, and/or silane should be a ratio of from about 30:1 to 1:1. However, the preferred ratio should be about 10:1.

The compound is allowed to penetrate into the surface of the ceramic article to a distance of 0.1 to 10 mm, depending upon roughness and intended degree of polishing. Typically for hydroxide systems, the bricks are allowed to remain contact the hydroxide for 12 hours at ambient temperature (up to 28 days) before being cured and then polished.

Suitable rotary polishing machines are well known in the industry, and typically incorporate circular abrasive pads, discs or drums, which mount to the bottom of the machine. Suitable pads or discs are widely commercially available from sources known to those skilled in the art, and may comprise diamond-impregnated abrasive discs or drums. However, other methods of polishing are also contemplated by the present invention.

To adequately polish the surface following this method, it is required to pass over the surface with the rotary polishing machine so as to allow the rotating disc, pad or drum having a grit from about 20 to 10000 to contact all areas of the surface at least once. However, multiple passes in alternating directions may be used to obtain superior results. During polishing there can be or not a continuous flow of polishing compound to adequately lubricate the polishing action and impart desired shine to the surface. When the appropriate passes have been made over a given surface, the surface is cleaned and inspected to determine whether the desired level of shine has been achieved. The surface must be dry in order to determine whether the desired shine has been achieved.

If the desired level of shine has not been achieved, the above process is repeated using abrasive pads of less coarse grit each time. As is well known in the industry, the coarseness of abrasives is indicated by numbers, with lower numbers representing coarser grit, and higher numbers representing finer grit. A typical ceramic surface in good condition may be initially polished with 120 to 3000 grit pads, discs or drums, depending on the desired sheen. With each successive repetition of the polishing process, the grit number of the desired pad will typically increase by 200 each time. A satisfactorily high gloss may be obtained with pads, discs or drums of anywhere from 800 to 10000 grit, depending on the preferred level of shine.

Alternatively, when polishing a rough or damaged ceramic surface, the surface may need to be honed before the polishing process is possible. The surface may first be cleaned, then honed, preferably with a 20, 50, or 120 grit rotary grinding disc making at least one pass. Preferably, water is not used. This process may require more passes or graduation from one grit level to another.

Once the surface has become dry, smooth and even, a hydroxide, silicate, siliconate, fluorosilicate, siloxane, silicon ester, and/or silane hardening/densifying compound (described earlier) is applied to the surface and allowed to soak into it. This compound will be applied at a rate or reapplied depending primarily upon the porosity of the ceramic, and will be allowed to soak into the surface. The surface will be allowed to thoroughly dry before polishing begins. The surface is then polished as described above, preferably starting with a 20 or 50 grit pad, disc or drum then stepping up to 200, 400, 800 grit, and so on until the desired shine is achieved. If using wet diamond tools, then a continuous flow of diluted polishing compound comprising water or water with hydroxide, silicate, siliconate, fluorosilicate, siloxane, silazane, silicon ester, and/or silane polishing compound (preferably diluted 10:1 with water as described above) with each grit is recommended.

EXAMPLES

The following illustrative non-limiting examples present the method of use of a selection of the above described compounds used according to the present invention in a variety of conditions and with ceramic presenting a variety of challenges.

Example 1

Ceramic—Sodium Hydroxide/Fumed Silica

After drying a common house brick it was flattened and smoothed using a rotary grinding machine with a diamond tool of a grit size of between 20-120.

A concentrated solution of sodium hydroxide and fumed silica in water in a ratio of 1:1.4:3 by weight was prepared and applied to the flattened, smoothed face of the brick. A sufficient amount was applied not only to wet the face of the brick, but to penetrate into the brick to a depth of a few millimetres.

Typically, the first grinding took place before any chemical treatment was carried out. This was done dry using a grit size of 80. Dry grinding was employed and the dust was captured by an approved dust extraction system so as not to create a health hazard for the operator.

The chemical was applied liberally and allowed to soak in and then the process was repeated second time soon after allowing greater penetration of the chemical into the ceramic. The brick was allowed to cure in ambient dry conditions for a period of 12 hours.

The ceramic surface was turned into an aluminosilicate glass making the surface consolidated allowing for the second grinding to take place. A second grinding procedure was carried out using a 120 grit diamond pad as to remove any previous scratches left by the previous procedure and also the pits from the deteriorated ceramic. This procedure was carried out using water as a lubricant. Due to the chemical process no further deterioration took place in the surface. A progression of finer grits from 200, 400, 800, 1500 and 3000 were used with water as a lubricant giving the brick surface a high lustre.

After the hardening/densifying compound has reacted with the ceramic and the final polishing has been done a diluted hydrochloric acid was applied to the surface of the brick and left in contact with the surface for about 10 minutes to neutralize the hydroxide which usually migrates from the ceramic. The final step of washing the brick by steam cleaning the surface and removing any remaining residue left.

The resultant surface had a visually pleasing reflective high gloss appearance. The treated polished face of the brick was resistant to liquid penetration. As a result, the polished face was graffiti/stick resistant, weather resistant and resistant to outward leaching and efflorescence of minerals from within the brick.

Low Clay Content Ceramic-Sodium Hydroxide/Potassium Hydroxide/Fumed Silica

After drying a common house brick it was flattened and smoothed using a rotary grinding machine with a diamond tool of a grit size of between 20-120. Dry grinding was employed and the dust was captured by an approved dust extraction system so as not to create a health hazard for the operator.

A concentrated solution of sodium hydroxide, potassium hydroxide and fumed silica in water in a ratio of 0.05:0.05:1.4:3 by weight was prepared and applied to the flattened, smoothed face of the brick. Sufficient was applied not only to wet the face of the brick, but to penetrate into the brick to a depth of a few millimetres.

The brick was allowed to cure in ambient dry conditions for a period of 12 hours.

The ceramic surface was turned into an aluminosilicate glass making the surface consolidated allowing for the second grinding to take place. A second grinding procedure was carried out using a 120 grit diamond pad as to remove any previous scratches left by the previous procedure and also the pits from deteriorated ceramic. This procedure was carried out using water as a lubricant. Due to the chemical process no further deterioration took place. A progression of finer grits from 200, 400, 800, 1500 and 3000 were used with water as a lubricant giving the brick surface a high lustre.

After the hardening/densifying compound has reacted with the ceramic and the final polishing was done a diluted hydrochloric acid was applied to the surface of the brick and left in contact with the surface for 10 minutes to neutralize the hydroxide which usually migrates from the ceramic. The final step of washing the brick was by steam cleaning the surface removing the remaining surface residue left.

The resultant surface had a visually pleasing reflective high gloss appearance. The treated polished face of the brick was resistant to liquid penetration. As a result, the polished face was graffiti/stick resistant, weather resistant and resistant to outward leaching and efflorescence of minerals from within the brick.

High Lime Content Ceramic

After grinding the surface of the brick flat the brick was placed in a kiln and heated to 800 degrees centigrade as to totally dry it and thermally activate it.

A concentrated solution of sodium hydroxide/fumed silica/water was added and allowed to soak in. After a 12 hour curing period the brick was fired at 400 degrees centigrade to sinter it before it was ground and polished as in process of the above example.

The resultant surface had a visually pleasing reflective high gloss appearance. The treated polished face of the brick was resistant to liquid penetration. As a result, the polished face was graffiti/stick resistant, weather resistant and resistant to outward leaching and efflorescence of minerals from within the brick.

Sodium Hydroxide/Potassium Hydroxide

After grinding the brick flat a mixture of sodium hydroxide/potassium hydroxide/water in a ratio of 1:1:3 was applied to the brick and allowed to cure for a period of 12 hours. The brick was then ground and polished as in "Example Low Clay Content Ceramic".

The resultant surface had a visually pleasing reflective high gloss appearance. The treated polished face of the brick was resistant to liquid penetration. As a result, the polished face was graffiti/stick resistant, weather resistant and resistant to outward leaching and efflorescence of minerals from within the brick.

Impregnation of Hardening/Densifying Solution

After the initial grinding the ceramic was allowed to dry before it was immersed into a hardening/densifying solution in a vacuum chamber. The ceramic was totally submerged as the vacuum was applied. When noted that most of the air was removed the vacuum was turned off and air was allowed to re-enter the chamber. After a period the ceramic was removed from the solution and allowed to cure and dry for 12 hours. The penetration of the solution due to impregnation was total in a thin walled porous ceramic of 10 mm. This allowed a chemical change, not only to the surface of the ceramic but to the entire thin wall of the ceramic. The hardening/densifying solution penetrated the entire thickness of the ceramic. The ceramic was then ground and polished as in the above examples. After neutralizing and steam cleaning the ceramic had a high lustre polish.

Example 2

Ceramic—Silicon Ester

Examples 1 or 2 of U.S. Pat. No. 6,454,632, using a silicon ester such as dibutyldiacetoxysilane can be carried out on a soft ceramic article such as brick instead of concrete to produce a hardened ceramic surface having a very high sheen finish.

Example 3

Ceramic—Silane

Examples 3, 4, 7 or 8 of U.S. Pat. No. 6,454,632, using a silane such as octyltrichlorosilane, butyltrichlorosilane, butyltriethoxysilane, octylrimethoxysilane or similar can be carried out on a soft ceramic article such as brick instead of concrete to produce a hardened ceramic surface having a very high sheen finish.

Example 4

Ceramic—Silazane

Examples 5 or 6 of U.S. Pat. No. 6,454,632, using a silazane such as hexamethyldisilazane, hexabutyldisilazane or similar can be carried out on a soft ceramic article such as brick instead of concrete to produce a hardened ceramic surface having a very high sheen finish.

Example 5

Ceramic—Fluorosilicate

Examples 9 or 10 of U.S. Pat. No. 6,454,632, using a fluorosilicate such as zinc fluoro silicate, magnesium fluorosilicate or similar can be carried out on a soft ceramic article such as brick instead of concrete to produce a hardened ceramic surface having a very high sheen finish.

Example 6

Silicate

Examples 11 or 13 of U.S. Pat. No. 6,454,632, using a silicate such as sodium silicate or similar can be carried out on a soft ceramic article such as brick instead of concrete to produce a hardened ceramic surface having a very high sheen finish.

Example 7

Siliconate

Examples 12 or 14 of U86454632, using a siliconate such as sodium methylsiliconate, sodium octylsiliconate or similar can be carried out on a soft ceramic article such as brick instead of concrete to produce a hardened ceramic surface having a very high sheen finish.

It is to be understood that the above-described arrangements and examples are only illustrative of the application of the principles of the present invention. Numerous modifications and alternative arrangements may be devised by those skilled in the art without departing from the spirit and scope of the present invention and the appended claims are intended to cover such modifications and arrangements.

The claims defining the invention are as follows:

1. A method of polishing a surface of a fired ceramic article, comprising the steps of:
    a) applying to a surface of a fired ceramic article a hardening/densifying compound comprising at least one hydroxide and at least one silicate, or at least one hydroxide and silica;
    b) allowing the hardening/densifying compound to contact the surface for a period of time sufficient to allow the hardening/densifying compound to harden the surface; and
    c) polishing the surface.

2. A method according to claim 1, wherein the step of polishing the surface further comprises applying to the ceramic surface a polishing compound.

3. A method according to claim 1, wherein the period of time is sufficient to allow the hardening/densifying compound to penetrate and harden the surface, and further comprising the steps of:
    d) neutralizing the surface;
    e) optionally sintering the surface; and
    f) steam cleaning the surface.

4. A method according to claim 1, wherein the fired ceramic article is a brick, tile, panel or three-dimensional solid.

5. A method according to claim 1, wherein the hardening/densifying compound is applied in a solvent selected from the group consisting of water, alcohol and organic solvents.

6. A method according to claim 1, wherein the hardening/densifying compound is applied at a rate sufficient to penetrate the surface from 0.01 mm to 10 mm.

7. A method according to claim 1, wherein the hardening/densifying compound in contact with the ceramic surface is allowed to dry and/or cure before polishing.

8. A method according to claim 1, wherein the hardening/densifying compound is applied in water, and wherein the ratio of water to the at least one hydroxide and at least one silicate, or the ratio of water to the at least one hydroxide and silica is from about 8:1 to 1:1 by volume.

9. A method according to claim 8, wherein the at least one hydroxide is selected from the group consisting of sodium hydroxide, potassium hydroxide, caesium hydroxide, and any combination thereof.

10. A method according to claim 8, wherein the silica is fumed silica.

11. A method according to claim 8, wherein the at least one silicate is a mixture of silicates.

12. A method according to claim 8, wherein the at least one silicate is sodium silicate.

13. A method according to claim 8, wherein the at least one silicate is a fluorosilicate or mixture of fluorosilicates.

14. A method according to claim 13, wherein the fluorosilicate is selected from the group consisting of zinc fluorosilicate, magnesium fluoro silicate and mixtures thereof.

15. A method according to claim 8, wherein the at least one silicate is a siliconate or mixture of siliconates.

16. A method according to claim 15, wherein the siliconate is sodium methyl siliconate.

17. A method according to claim 2, wherein the polishing compound comprises one or more of hydroxides, silicates, siliconates, fluorosilicates, siloxanes, silazanes, silanes, silicon esters, and combinations thereof, in a solvent comprising water or alcohol.

18. A method according to claim 17, wherein the polishing compound comprises water and a compound selected from the group consisting of hydroxide, silicates, siliconates, fluorosilicates, siloxanes, silazanes, silanes, silicon esters, and combinations thereof at a ratio from about 30:1 to 1:1 by volume.

19. A method according to claim 18, wherein the ratio is about 10:1 by volume.

20. A method according to claim 1, wherein the surface is polished mechanically by a polishing disc, drum or pad having a grit coarseness range from about 20 to 10,000.

21. A method of polishing a kiln-fired ceramic surface, comprising the steps of: (a) applying to the ceramic surface a diluted polishing compound, at a rate sufficient to adequately penetrate the surface, wherein the diluted polishing compound comprises at least one hydroxide and at least one silicate, or at least one hydroxide and silica, in water or alcohol; and (b) polishing the ceramic surface to which the diluted polishing compound has been applied.

22. A method according to claim 21, wherein the diluted polishing compound is in water.

23. A method according to claim 21, further comprising the steps of: (c) cleaning the ceramic surface; (d) applying to the ceramic surface additional diluted polishing compound; and (e) polishing the ceramic surface with a polishing pad, disc, or drum having a finer grit than was used in previous polishing step.

24. A method according to claim 23, wherein steps (c) through (e) are repeated until the surface has a desired level of shine.

25. A method of honing and polishing a rough, irregular, ceramic surface, comprising the steps of:
- (a) honing the ceramic surface with a rough grit honing pad, disc or drum with or without a lubricant to produce a substantially smooth, even surface;
- (b) applying to the ceramic surface a hardening/densifying compound comprising at least one hydroxide and at least one silicate, or at least one hydroxide and silica, in a solvent selected from the group consisting of water and alcohol; and
- (c) allowing the hardening/densifying compound to remain in contact with the ceramic surface for a period of time sufficient to harden the surface of the ceramic;
- (d) polishing the ceramic surface.

26. A method according to claim 25, wherein the lubricant, when present, is water.

27. A method according to claim 25, further comprising the steps of:
- (e) cleaning the ceramic surface;
- (f) applying to the ceramic surface a diluted polishing compound;
- (g) polishing the ceramic surface with a polishing pad, disc or drum having a finer grit than was used in previous polishing step; and repeating steps (e) through (g) until, upon cleaning, the surface has a desired level of shine.

28. A method according to claim 27, further comprising a preliminary step of cleaning the ceramic surface and allowing the ceramic surface to dry prior to the step of applying the hardening/densifying compound to the ceramic surface.

29. A method according to claim 27, further comprising removing an existing coating before honing and polishing the ceramic surface, the method comprising the preliminary steps of:
- (i) abrading the ceramic surface with a coarse rotating grinder disc;
- (ii) applying a chemical stripper to remove any remaining part of the coating; and
- (iii) cleaning the ceramic surface.

30. A method of removing and leveling soft, porous, ceramic from a cured ceramic surface and polishing the surface, the method comprising the steps of:
- (a) abrading and removing a soft ceramic surface with a coarse rotating grinder;
- (b) cleaning the ceramic surface and allowing it to dry;
- (c) applying to the ceramic surface a hardening/densifying compound comprising at least one hydroxide and at least one silicate, or at least one hydroxide and silica in a solvent selected from the group consisting of water and alcohol;
- (d) allowing the hardening/densifying compound to remain in contact with the ceramic surface for a period of time sufficient to harden/densify the surface;
- (e) polishing the ceramic surface with a polishing pad, disc or drum having a grit coarseness from about 20 to 10,000;
- (f) cleaning the ceramic surface;
- (g) applying to the ceramic surface a diluted polishing compound comprising one or more selected from the group consisting of hydroxides, silicates, siliconates, fluorosilicates, siloxanes, silazanes, silanes, silicon esters, and any combinations thereof in a solvent selected from the group consisting of water and alcohol;
- (h) polishing the ceramic surface with a polishing pad, disc or drum having a less rough grit than was used in previous polishing step; and
- (i) repeating steps (f) through (h) until, upon cleaning, the surface has a desired level of shine.

31. A method according to claim 1, comprising treating the ceramic surface after polishing with a diluted acidic solution and then rinsing the surface with water or a steam cleaner.

32. A method according to claim 1, wherein the hardening/densifying compound is applied to the ceramic surface to form an alumino silicate, calcium silicate or multi-component silicate glass.

33. A method according to claim 1, wherein the hardening/densifying compound reacts with the ceramic to form an alumino silicate, calcium silicate or a multi-component glass.

34. A method according to claim 1, wherein the surface is an in situ wall.

35. A ceramic prepared by the method of claim 1.

36. A ceramic according to claim 35, comprising a non-stick surface.

37. A ceramic according to claim 35, comprising a surface resistant to mineral leaching.

38. A ceramic according to claim 35, comprising a surface resistant to penetration of oil, paint, solvents, and other chemicals.

39. A ceramic according to claim 35, comprising a surface resistant to abrasion and weathering.

40. A ceramic according to claim 35, in the form of a brick, tile or any three-dimensional shape.

41. A ceramic according to claim 35, wherein application of a hardening/densifying compound creates a surface of high lustre creating a reflective surface.

42. A ceramic according to claim 35, wherein application of a hardening/densifying compound which comprises a hydroxide forms a surface resistant to mildew and microbiotic growth.

43. A method according to any one of claim 1, 21, 25 or 30, wherein the hardening/densifying compound comprises at least one hydroxide and silica.

44. A method according to claim 43, wherein the silica is fumed silica.

45. A method according to any one of claim 1, 21, 25 or 30, wherein the hardening/densifying compound comprises at least one hydroxide and at least one silicate.

46. A method according to claim 45, wherein the silicate is sodium silicate.

47. A method according to claim 43, wherein the at least one hydroxide is sodium hydroxide, potassium hydroxide, caesium hydroxide or any combination thereof.

48. A method according to claim 45, wherein the at least one hydroxide is sodium hydroxide, potassium hydroxide, caesium hydroxide or any combination thereof.

* * * * *

UNITED STATES PATENT AND TRADEMARK OFFICE
CERTIFICATE OF CORRECTION

PATENT NO.       : 8,465,805 B2
APPLICATION NO. : 12/739219
DATED           : June 18, 2013
INVENTOR(S)     : Walter Henry Huber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 335 days.

Signed and Sealed this
Eighth Day of September, 2015

Michelle K. Lee
*Director of the United States Patent and Trademark Office*